United States Patent
Uchida et al.

(10) Patent No.: US 7,683,265 B2
(45) Date of Patent: Mar. 23, 2010

(54) GROMMET AND FORMING METHOD FOR THE GROMMET

(75) Inventors: Yoshimi Uchida, Yokkaichi (JP); Koji Yonezu, Okazaki (JP); Manabu Matsumoto, Okazaki (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 313 days.

(21) Appl. No.: 11/779,928

(22) Filed: Jul. 19, 2007

(65) Prior Publication Data

US 2008/0017401 A1    Jan. 24, 2008

(30) Foreign Application Priority Data

Jul. 20, 2006 (JP) ............................. 2006-197890

(51) Int. Cl.
*H02G 3/22* (2006.01)

(52) U.S. Cl. .................. 174/153 G; 174/650; 174/654; 174/152 G; 174/668; 174/152 R; 16/2.1; 439/628; 277/628

(58) Field of Classification Search .................. 174/650, 174/654, 658, 668, 152 G, 153 G, 151, 152 R; 248/56; 16/2.1, 2.2; 277/628, 606, 607; 439/604, 587

See application file for complete search history.

(56) References Cited

U.S. PATENT DOCUMENTS 2,739,841 A * 3/1956 Soffer ........................ 251/349
5,531,459 A * 7/1996 Fukuda et al. ............... 277/606
6,685,195 B2   2/2004 Uchida et al.
6,737,583 B2 * 5/2004 Saeki et al. .................. 174/669
6,897,380 B2   5/2005 Sakata et al.

FOREIGN PATENT DOCUMENTS

JP    2004-187357    7/2004

OTHER PUBLICATIONS

English language Abstract of JP 2004-187357.

* cited by examiner

*Primary Examiner*—Dhiru R Patel
(74) *Attorney, Agent, or Firm*—Greenblum & Bernstein P.L.C.

(57) ABSTRACT

A grommet is formed having a funnel shaped portion and a tubular portion linked to a small diameter end portion of the funnel shaped portion. The grommet is inserted to an aperture of a car body panel after a wire harness is passed through and attached to the funnel shaped portion and the tubular portion, and a body latch groove provided on the external circumferential surface of the funnel shaped portion is latched to the car body panel. An extended tubular portion is provided that projects from the tubular portion, and extends inside the funnel shaped portion. A plurality of ribs is provided on an external circumferential surface of the extended tubular portion. The ribs include type one ribs having grooves on both surfaces of an element linking the rib to the extended tubular portion, and a type two rib having no groove.

20 Claims, 8 Drawing Sheets

GROMMET AND FORMING METHOD FOR THE GROMMET

CROSS-REFERENCE TO RELATED APPLICATIONS

The present disclosure relates to subject matter contained in priority Japanese Patent Application No. 2006-197890, filed on Jul. 20, 2006, which is herein incorporated by reference in its entirety.

BACKGROUND OF THE INVENTION

1. Field of the Invention

The present invention relates to a grommet for mounting on a wire harness to be wired in automobiles, and a method of forming the grommet.

2. Description of Related Art

It is known in the art to mount a grommet on a wire harness wired from an engine compartment to a passenger compartment of an automobile. Such a grommet is mounted to an aperture of a car body panel that separates a passenger compartment from an engine compartment of the automobile. The grommet protects the wire harness passing through the aperture and provides protection from water and dust, as well as sound insulation between the engine compartment and the passenger compartment.

Several grommets of this general type are known in the art. An example of such a grommet is described in Japanese Patent Laid-open Publication 2004-187357 and shown in FIGS. 6A and 6B of the present application. The grommet 1 shown in FIGS. 6A and 6B includes a tubular or funnel shaped portion 2 having a gradually widening diameter and a tubular portion 3 linked to the smaller diameter end part of the funnel shaped portion 2. A body latch groove portion 4 is provided in the larger diameter end part of the funnel shaped portion 2, and fixes the grommet to a car body panel. An extended tubular portion 5 projecting from the tubular portion 3, which extends inside the funnel shaped portion 2, is provided. Anti-turn-up ribs 6 are arranged at 90 degree intervals, extending from the external circumferential surface of the extended tubular portion 5. A plurality of rib portions 2a are provided on the external surface of the funnel shaped portion 2. These rib portions 2a extend and radiate from the body latch groove portion 4 to the part of the funnel shaped portion 2 where the funnel shaped portion 2 joins the tubular portion 3. The wire harness W/H passes through the tubular portion 3 into the space inside the funnel shaped portion 2 of the grommet 1. The wire harness W/H is then fixed by a tape T at the end section of the tubular portion 3.

Figure 6:
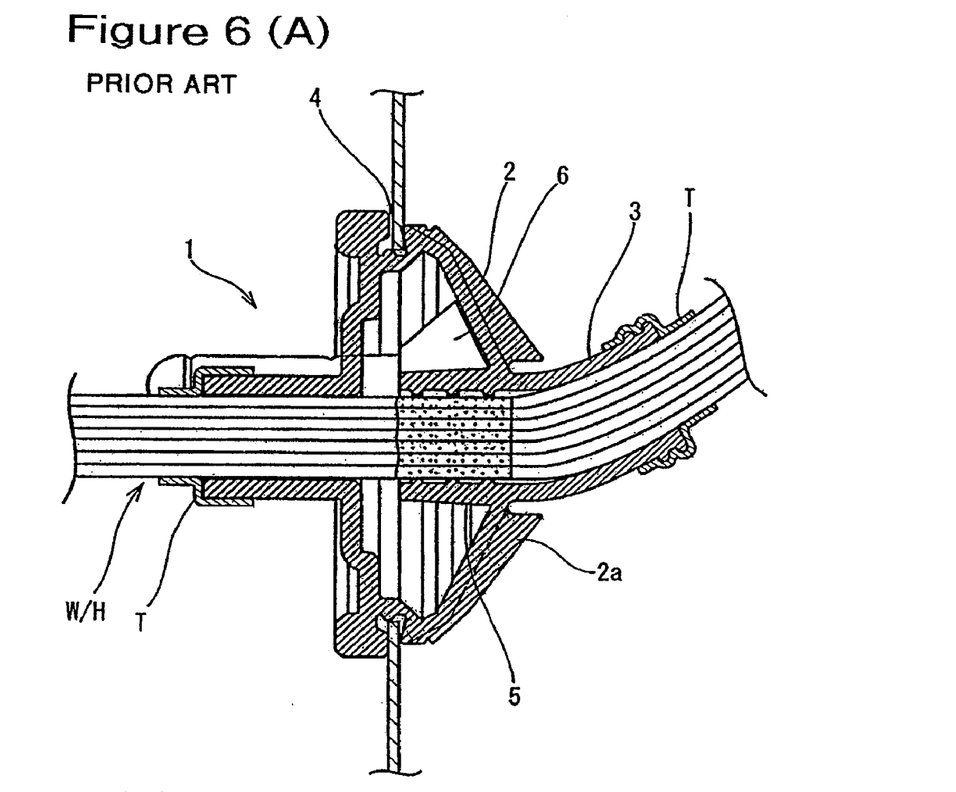
FIG. 6A is a view of a conventional grommet.
FIG. 6B is a view of conventional grommet.

A wire harness W/H filled with a water sealing agent is passed through and tightly attached to the extended tubular portion 5, which extends inside the funnel shaped portion 2. Thereby, the wire harness has the function of a water sealing portion. Accordingly, having the extended tubular portion projecting into the funnel shaped portion, which surrounds the water sealing portion, enables the tubular portion extending from the funnel shaped portion to flex easily along with the wire harness. Flexibility in wiring and routing is thus improved. Further, reinforcing the extended tubular portion with the anti-turn-up rib prevents the extended tubular portion from turning up, and the sealing between the extended tubular portion and the wire harness is substantially kept intact. Further, the anti-turn-up rib is reinforced by being linked to the funnel shaped portion, deformation of the funnel shaped portion is thus avoided, and deformation of the body latch groove portion on the external circumferential surface can be prevented. Thereby, the gripping force attaching the grommet to the car body panel is further improved.

Figure 7:
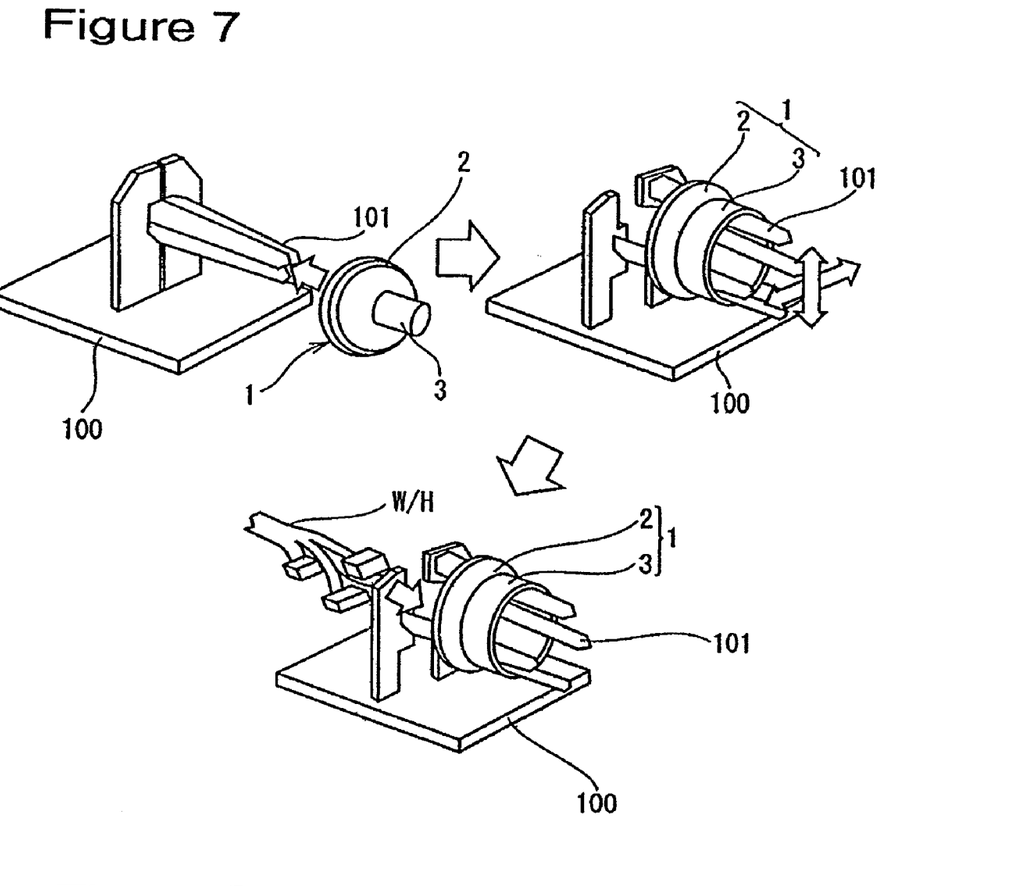
FIG. 7 schematically shows how a wire harness is put through the grommet by expanding the grommet using an expander.

The grommet shown in FIGS. 6A and 6B has the above mentioned various advantages by providing an extended tubular portion that extends inside the funnel shaped portion, along with providing anti-turn-up ribs that extend and radiate on the external circumferential surface, the ribs being linked to the internal surface of the funnel shaped portion. As shown in FIG. 7, however, a problem arises when a wire harness is passed through the grommet 1. Specifically, when a wire harness is inserted into the grommet 1, expander fingers 101 of an expander 100 are placed inside the grommet 1, and then gradually expanded therein. The wire harness is inserted in a condition where the tubular portion 3 and the extended tubular portion 5 of the grommet 1 are expanded.

Expanding the diameter of the grommet using the expander fingers is difficult since the extended tubular portion 5 and the funnel shaped portion 2 are linked by ribs 6. Thus, it is difficult to expand the grommet to the required size.

The above stated problem can be solved by disconnecting a linking portion of the extended tubular portion 5 and the rib 6, or a linking portion of the rib 6 and the funnel shaped portion 2. However, without linking the rib 6 and the funnel shaped portion 2, deformation of the funnel shaped portion 2 cannot be controlled, which leads to a decrease of the gripping force when the grommet is attached to the car body panel. Further, when the linking portion between the rib 6 and the extended tubular portion 5 is eliminated, reinforcement for the extended tubular portion becomes insufficient, which causes the following problems: the extended tubular portion may be turned up easily and the water sealing function deteriorates. Therefore, as shown in FIG. 8, providing a notch 7 to the linking portion between the rib 6 and the extended portion 5 to reduce the size of the linking portion is considered.

Figure 8:
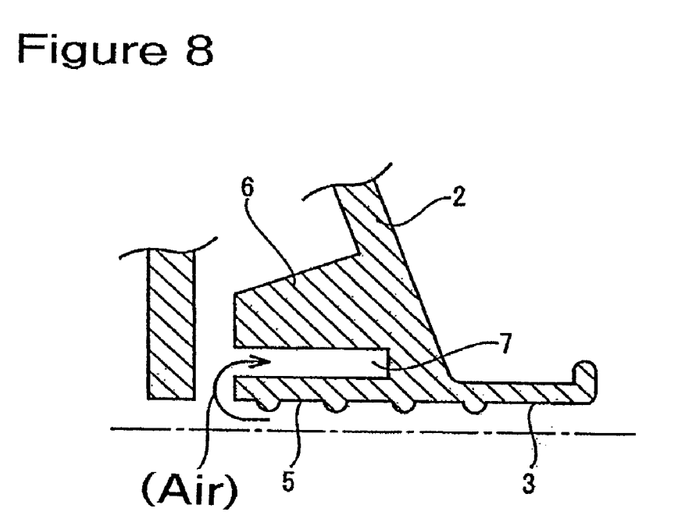
FIG. 8 is a view of a rib that projects on an external circumference of the extended tubular portion.
Figure 9:
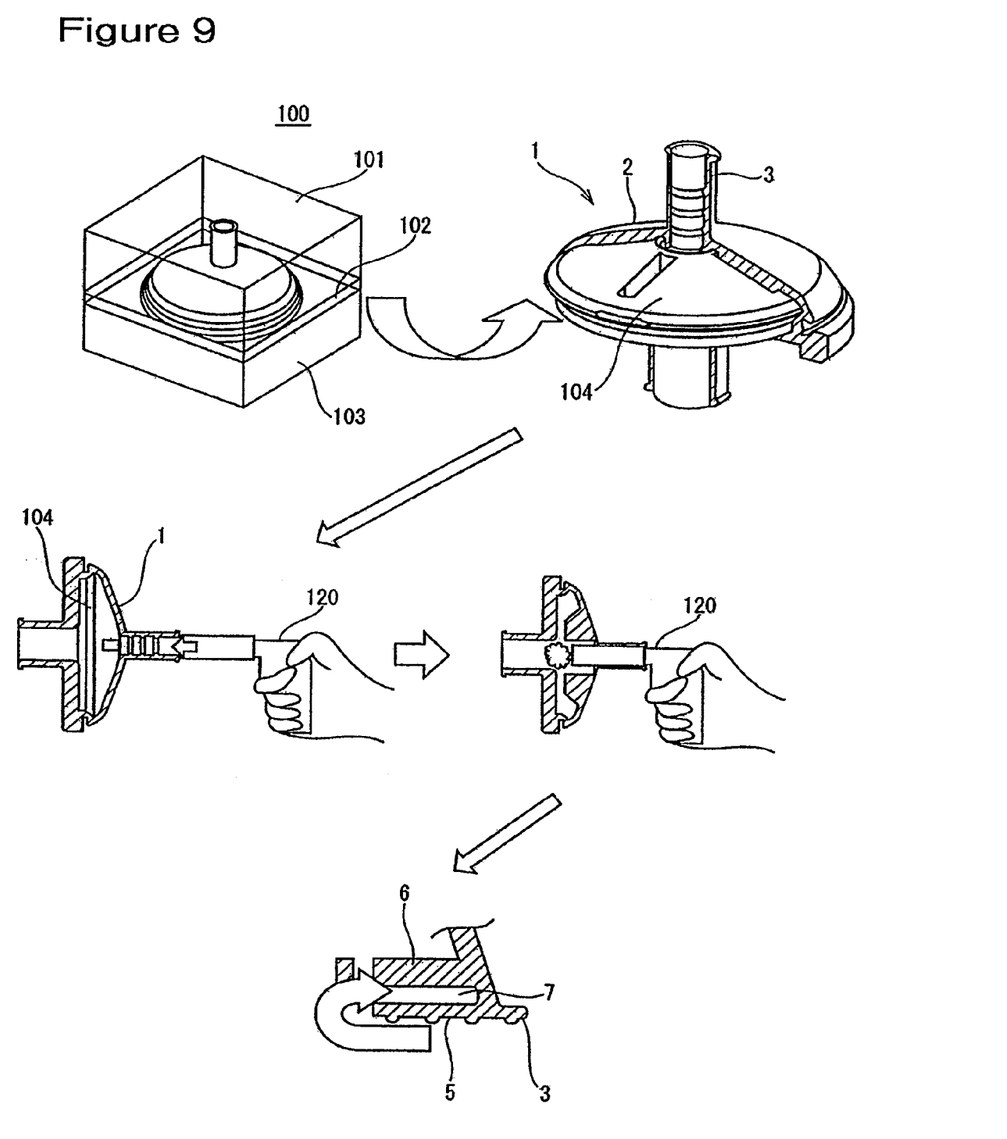
FIG. 9 shows a grommet forming method.

However, when the rib 6 is configured as shown in FIG. 8, a problem arises: when the grommet 1 is formed, its removal from a metal mold becomes difficult. Specifically, as shown in FIG. 9, the grommet 1 is formed by using a metal mold 100 including an upper mold 101, a center mold 102, a lower mold 103 and a center core 104. The grommet is formed by filling the grommet forming material made of rubber or elastomer in the metal mold 100. Then, the upper, center, lower molds 101 through 103 are removed. Next, air is injected between the center core 104 and the grommet 1 using an air gun 120 so that the grommet 1 is expanded, and then the expanded grommet 1 is removed from the center core 104. In the process of the grommet 1 removal, air injected by the air gun 120 flows into the extended tubular portion 5, however, the air is not supplied between the center core 104 and a funnel shaped portion 2 of the grommet 1. As a result, the funnel shaped portion 2 of the grommet 1 cannot be sufficiently expanded, therefore, the grommet 1 cannot be removed from the center core 104.

SUMMARY OF THE INVENTION

The present invention is provided considering the above-described problems. A purpose of the present invention is to provide a grommet which includes an extended tubular portion that extends inside a funnel shaped portion, and ribs that project from the extended tubular portion, and are connected to the internal surface of the funnel shaped portion. Such a grommet is configured to expand to a required size using an expander when a wire harness is inserted, and to easily remove a center core of a metal mold when the grommet is formed using the metal mold.

An aspect of the present invention provides a grommet including a funnel shaped portion including a small diameter end portion; a tubular portion provided at the small diameter end portion of the funnel shaped portion; an extended tubular portion projecting from the tubular portion and extending inside the funnel shaped portion; and a plurality of ribs provided on an external circumferential surface of the extended tubular portion, the ribs extending in a longitudinal direction of the extended tubular portion and radiating outwardly therefrom; wherein the plurality of ribs includes a type one rib having an element linking the type one rib to the exterior of the extended tubular portion and a groove on each side of the element, and a type two rib having an element linking the type two rib to the exterior of the extended tubular portion without grooves. Further, the plurality of ribs may include a total of four ribs including at least one type one rib and a type two rib. The grommet may be formed unitarily and in one piece. In a further aspect of the present invention, grommet is formed of one of rubber and an elastomer. In a further aspect of the present invention, the grommet is inserted into an aperture of a car body panel after a wire harness is passed through and attached to the funnel shaped portion and the tubular portion, and a body latch groove provided on the external circumferential surface of the funnel shaped portion is latched to the car body panel.

A further aspect of the present invention provides a grommet in which the ribs may include the type one rib and the type two rib having one of a trapezoidal shape and a triangular shape, including an inner side linked to the external circumferential surface of the extended tubular portion, and a base linked to the internal surface of the funnel shaped portion, and wherein an external side and an upper side are spaced from the internal surface of the funnel shaped portion.

The grommet provides a reinforcement rib placed between the external circumferential surface of the extended tubular portion and the internal surface of the funnel shaped portion. Therefore, the extended tubular portion and the funnel shaped portion are reinforced. Among the plurality of ribs, except one type one rib, the type two ribs are linked to an external circumferential surface of the extended tubular portion via a thin linking portion. Therefore, the extended tubular portion can be expanded to a predetermined size using an expander when a wire harness is inserted. Efficiency of the wire harness insertion is thus improved. Further, because a thin linking portion is not provided to the one type one rib, and the type one rib is linked to the extended tubular portion via a thick portion, the type one rib prevents the extended tubular portion from turning up. Further, rather than a notch, grooves are provided between the extended tubular portion and the type two rib to form a thin linking portion. Therefore, when the grommet is formed using a metal mold which includes a center core, injected air in the process of center core removal can flows between the external circumferential surface of the center core and the internal surface of the funnel shaped portion of the grommet. Therefore, removal of the center core is easily achieved by expanding the grommet.

A further aspect of the present invention provides a grommet having a plurality of ribs, wherein each of the plurality of ribs is linked to the internal surface of the funnel shaped portion. Further, the plurality of ribs includes one type two rib and at least one type one rib; the plurality of ribs includes one type two rib and a plurality of type one ribs; and the grommet includes four ribs positioned at ninety degree intervals. In a further aspect of the present invention, the grommet includes one type two rib and three type one ribs. Further, a wall thickness of each of the type one ribs is in the range of 4-6 mm. The wall thickness of the type two rib is in the range of 4-6 mm. The element linking the type one rib to the exterior of the extended tubular portion with grooves on each side thereof includes a thin portion having a wall thickness in the range of 1-2 mm.

An aspect of the present invention includes a method of forming a grommet including a funnel shaped portion including a small diameter end portion; a tubular portion provided at the small diameter end portion of the funnel shaped portion; an extended tubular portion projecting from the tubular portion and extending inside the funnel shaped portion; and a plurality of ribs provided on an external circumferential surface of the extended tubular portion, the ribs extending in a longitudinal direction of the extended tubular portion and radiating outwardly therefrom; wherein the plurality of ribs includes a type one rib having an element linking the type one rib to the exterior of the extended tubular portion and a groove on each side of the element, and a type two rib having an element linking the type two rib to the exterior of the extended tubular portion without grooves; the method including providing a metal mold including an upper mold, a center mold, a lower mold and a center core; filling the metal mold with a grommet forming material; removing the upper mold, center mold and lower mold thereafter; injecting air between an external surface of the center core and the grommet so that the grommet is expanded; and removing the center core from the expanded grommet.

In the forming method of the grommet in the present invention, in the process of removing the center core from the grommet after the grommet is formed, air injected between the center core and the grommet flows more easily between the center core and internal surface of the grommet, at a location where a rib is provided on the external circumference of the extended tubular portion, where the type two rib is formed having the thick portion without grooves. Pressure of the air to be injected inside the grommet is adequately increased to expand the first grommet sufficiently so that removal of the center core can be performed easily.

As is clear from the above explanation, according to the grommet of the present invention, providing the extended tubular portion projecting into the funnel shaped portion and the series of ribs between the extended tubular portion and the internal surface of the funnel shaped portion prevents the extended tubular portion from turning up, and secures the coherence between the extended tubular portion and the wire harness. Further, deformation of the body latch groove portion on the external circumferential surface of the funnel shaped portion is also prevented, and the gripping force of the grommet against the car body panel is increased. Furthermore, by providing the water sealing portion that seals the wire harness wires in the extended tubular portion, the water sealing portion is not placed in the tubular portion, which projects from the funnel shaped portion. Therefore, the wire harness can be easily flexed along with the tubular portion. Flexibility and wiring availability are thus improved. Moreover, the ribs are linked to the extended tubular portion via thin linking portions. Therefore, when the wire harness is inserted in the grommet, the extended tubular portion can be expanded without strain to the predetermined size by the fingers of the expander. The wire harness can be passed through the grommet smoothly.

In the forming process of the grommet of the present invention using the metal mold including upper, center and lower molds and the center core, the configuration of the series of ribs that are placed on the extended tubular portion and the internal surface of the funnel shaped portion is improved; one rib having no notch and the remaining ribs having a thin linking portion. Such improvements enable the grommet to expand by way of the injected air that flows onto the internal surface of the grommet in the process of the center core removal. In such structure, the center core can be smoothly removed from the grommet.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice. The following describes a preferred embodiment of the present invention with reference to the drawings. A grommet 10 is formed unitarily and in one piece, from a suitable material such as, for example, rubber or an elastomer. The grommet 10 includes a funnel shaped portion 12 which includes a conical surface having a flared relatively larger diameter end and a narrower end, a first tubular portion 11 extending outwardly from the narrower end, and a substantially closed face 20 at the flared end. The closed face 20 is thin and split in half. A second tubular portion 21 projects from the central part of the closed face 20. A body latch groove portion 16 is provided annularly on the external circumferential surface of the flared end of the funnel shaped portion 12. A plurality of ribs 13 are provided on the external surface of the funnel shaped portion 12, which extend radially on the external surface. An extended tubular portion 18 is provided inside the funnel shaped portion 12, which is linked to the first tubular portion 11.

The extended tubular portion 18 includes an end section 18b which extends inside the funnel shaped portion 12 up to the level of the plane that includes the body latch groove portion 16 provided on the external circumferential surface of the funnel shaped portion 12. Further, the internal diameters of the extended tubular portion 18 and tubular portion 11 are smaller than the external diameter of the wire harness W/H to be inserted. Consequently, the wire harness W/H is tightly held. Circular ribs 18a are provided on the internal circumferential surface of the extended tubular portion 18. These ribs 18a are arranged at predetermined intervals along the direction of axial line L. The present invention may include any suitable number of ribs 18a, and in the present embodiment, includes three circular ribs 18a.

Figure 2:
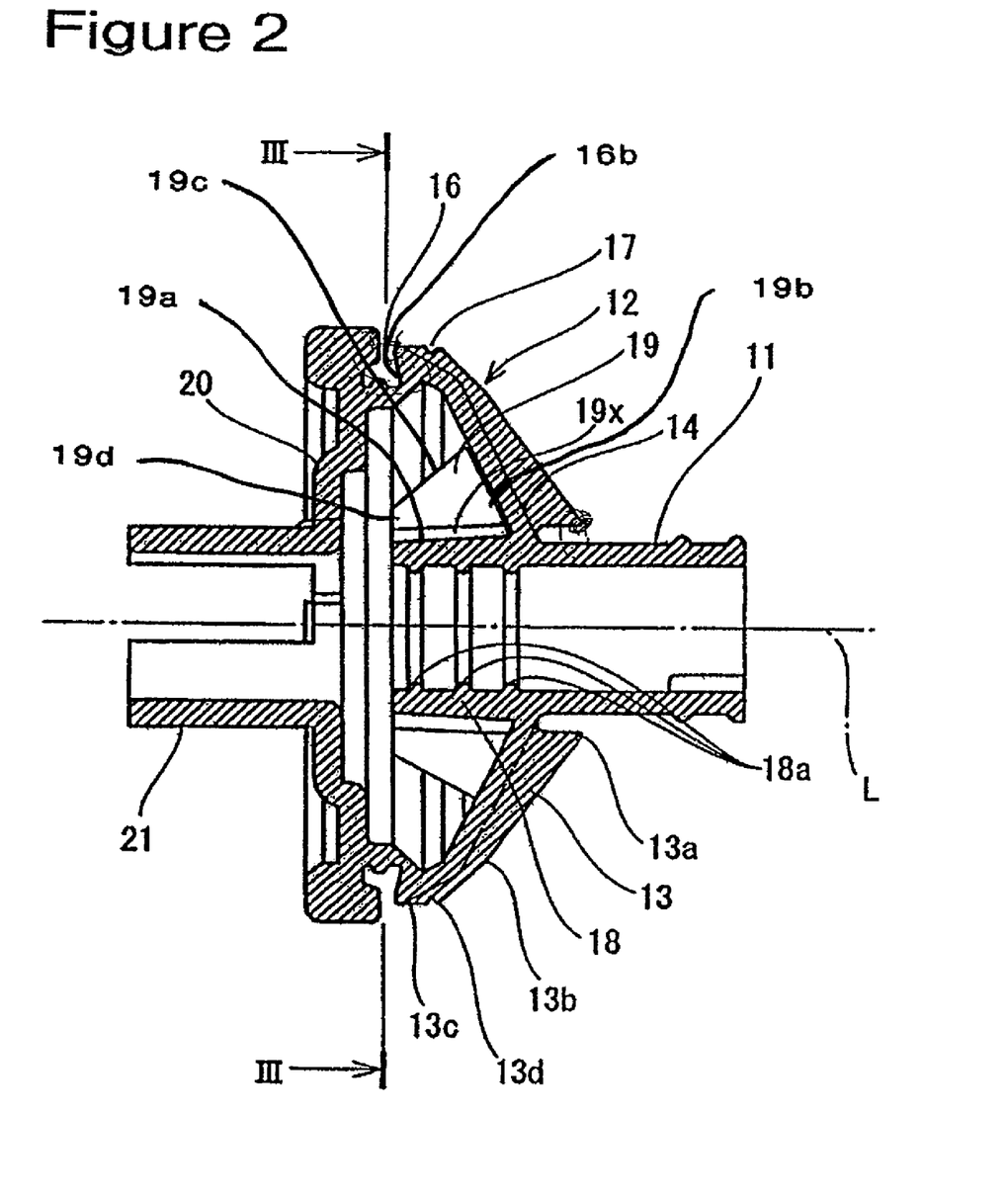
FIG. 2 is a cross-sectional view taken along line II-II of FIG. 1.
Figure 3:
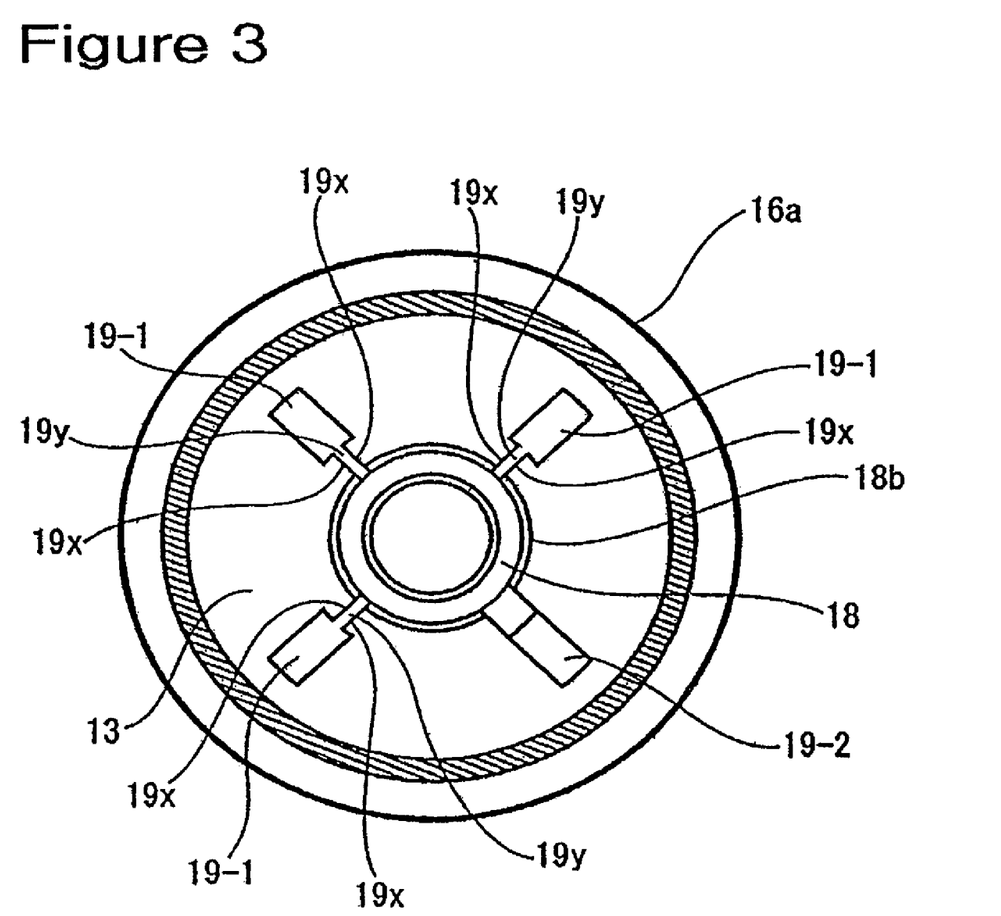
FIG. 3 is a cross-sectional view taken along line III-III of FIG. 2.

As shown in FIGS. 2 and 3, the external circumferential surface of the extended tubular portion 18 includes four ribs 19 that are arranged at 90 degree intervals. The ribs have an approximately trapezoidal shape: an inner side 19a extends the entire length in the direction of the axial line of the tubular extended portion 18; a lower side, a side of the tubular portion 11, 19b extends along the internal surface of the funnel shaped portion 12; an outer inclined side 19c is spaced from the internal surface of the funnel shaped portion 12; and an upper side 19d is spaced from the closed face 20.

Three out of four ribs 19 are type one ribs 19-1, while the other rib 19 is a type two rib 19-2. The three type one ribs 19-1 have a pair of grooves 19x and 19x on both sides of a linking portion, along the inner side linked to the extended tubular portion 18, extending in the axial direction of the axial line of the extended tubular portion 18. A thin linking portion 19y is provided between the pairs of grooves 19x and 19x. In contrast, the type two rib 19-2 does not include the groove 19x and it has the same overall thickness. In the present embodiment, both the type one rib 19-1 and the type two rib 19-2 have the same thickness of 5 mm, while the thin linking portion 19y of the type one 19-1 has a thickness of 1.5 mm.

Figure 1:
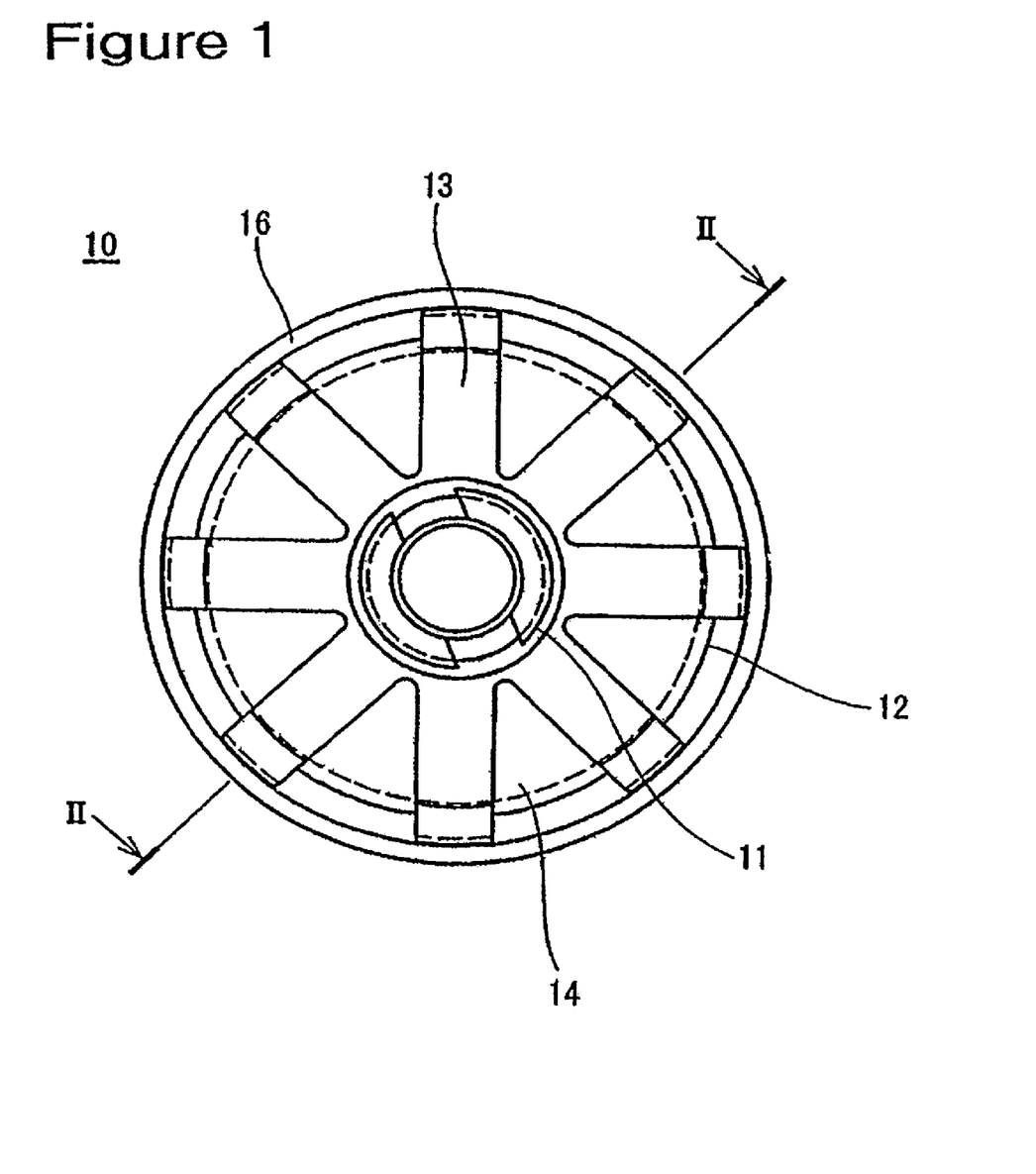
FIG. 1 is a right side view of a grommet according to an embodiment of the present invention.

The ribs 13 provided on the external surface of the funnel shaped portion 12 are arranged at predetermined intervals along a circumferential direction at the funnel shaped portion. The ribs 13 extend in the axial direction of the grommet, and extend in the axial direction from the end section of a tubular portion side wall 16b, which sandwich body latch groove portions 16, to a location proximate to a space between the linking portion and the first tubular portion 11. The present invention includes any suitable number of ribs 13, and in the present embodiment includes eight ribs 13. The width of rib 13 is constant in the axial direction of line L, therefore, as shown in FIG. 1, the ribs extend and radiate from the side of extended tubular portion 11 to the tubular portion side wall 16b. A tip 13a of the rib 13 provided on the side of the tubular portion 11 disposes a neighboring rib 13 in close proximity. An end section 13c of the rib 13 provided on the side of the tubular portion side wall 16b has a space between a neighboring rib 13. A triangular recess 14 made of an external circumferential surface of the funnel shaped portion 12 is extended from the smaller-diameter side to the larger-diameter side. As shown in FIG. 2, the projection amount of the rib 13 gradually decreases from their tip 13a of the smaller-diameter side to a contact point 13b, where the grommet 10 comes into contact with the peripheral rim of the aperture H of a body panel P when mounted. The inclination angle of the ribs 13 is reduced from the contact point 13b to the position 13d, where the projection amount of the ribs 13 attains the height of the tubular portion side wall 16b. From the position 13*d* to the end section 13*c*, the ribs 13 extend substantially parallel to axial line L of the grommet 10, thereby forming a plateau. The plateau is provided with a notch 17 having a cross-section in the form of letter V, at the side of the tubular portion side wall 16*b*, adjacent to the position 13*d*.

The flared end of the funnel shaped portion 12 includes a closed face 20, which is thin and is split in half. The second tubular portion 21 projects from the central part of the closed face 20.

The grommet 10 is fitted with a wire harness in the following manner. A wire harness W/H is formed of a bundle of electrical wires into which a water sealing agent is injected. Then, wire harness W/H is inserted into the grommet 10 on a production line. As shown in FIG. 7, when the wire harness is passed through, the grommet 10 is put on expander fingers 101 of an expander 100, and then the grommet 10 is expanded by the expander fingers 101. The extended tubular portion 18 and the funnel shaped portion 13 are linked via four ribs 19, therefore, expanding the grommet would be potentially difficult. However, thin linking portions 19*y* are provided on the linking parts to the extended tubular portion 18 for the three type one ribs 19-1, therefore, the extended tubular portion 18 can be expanded easily to a required size using the expander fingers 101.

Figure 4:
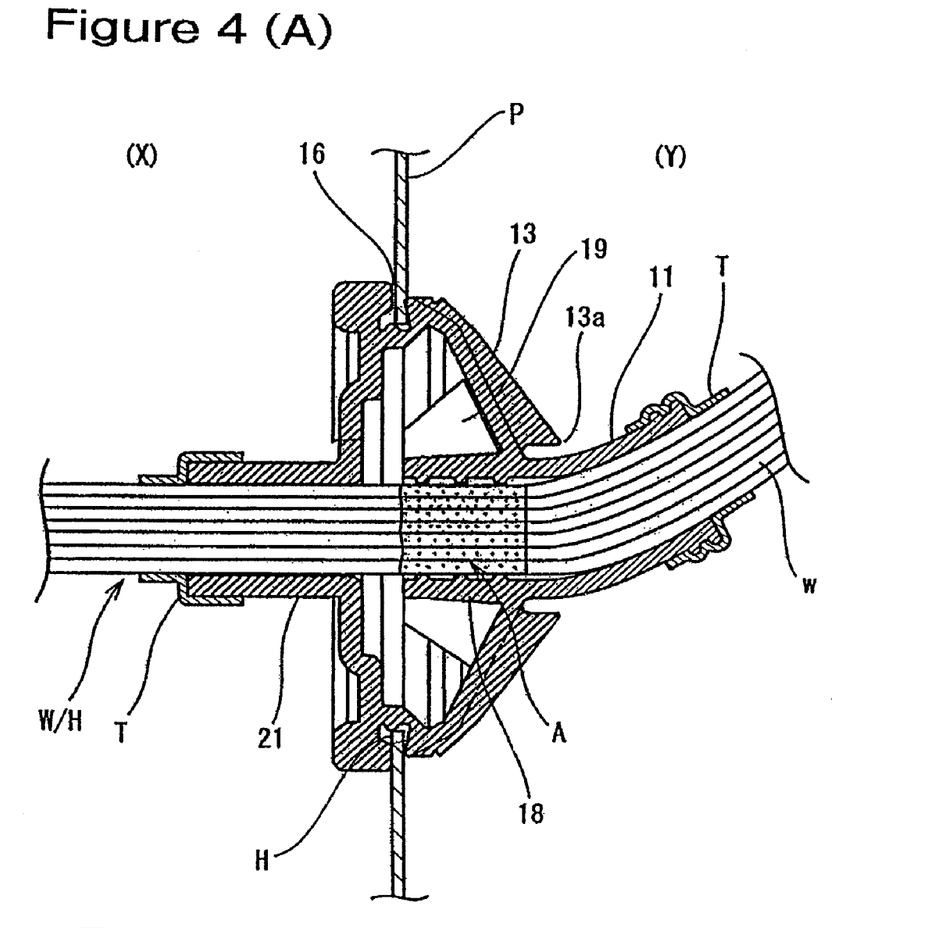
FIG. 4A is a cross-sectional view of the grommet when it is attached to a car body panel.
FIG. 4B is a cross-sectional view of an extended tubular portion.

In this way, when the grommet 10 is expanded with expander fingers 101, a wire harness W/H is passed through the tubular portion 11, the extended tubular portion 18 and the funnel shaped portion 12 of the grommet 10. Specifically, as shown in FIGS. 4A and 4B, a bundle of wires W that form a wire harness W/H are filled with a water sealing agent S, and is wrapped with a foamed sheet (not shown in the figures) to provide a water sealing zone A. The wire harness W/H is then passed through the first tubular portion 11, extended tubular portion 18 and second tubular portion 21, such that the water sealing zone A is positioned in the extended tubular portion 18. The wire harness W/H is wrapped with a tape T to be fixed with the tubular portions 11 and 21 respectively. As the internal diameters of the first tubular portion 11 and extended tubular portion 18 are designed to be smaller than the external diameter of the wire harness W/H, the tubular portion 11 and extended tubular portion 18 are pressed open in the enlarging direction when the wire harness W/H is inserted. Therefore, the external circumferential surface of the wire harness W/H is firmly fixed in these tubular portions. FIG. 4B shows the cross-section of the extended tubular portion 18 in the above-mentioned state, in which the circular ribs 18*a* of the extended tubular portion 18 are firmly fixed around the external circumferential surface of the wire harness W/H. Such a configuration, together with the use of the water sealing agent S, provides complete water sealing effect.

The grommet 10 is mounted in the following manner. The first tubular portion 11 of the grommet 10 is inserted from outside of the engine compartment (Y) to the passenger compartment (X) side via the aperture H formed in the car body panel P. When the funnel shaped portion 12 of the grommet 10 is passed through the aperture H, up to contacting point 13*b* of the rib 13 which is identical to the internal diameter of the aperture H, the operator feels a resistance caused by the pressure between the ribs 13 and the internal circumferential surface of the aperture H. When the operator feels the first resistance, he/she pushes the grommet 10 further, so that the ribs 13 are squeezed and pass through the aperture H. A recess 14 is provided between the ribs 13, and as the recess 14 is flexed, the funnel shaped portion 12 is shrunk smoothly. At the same time, as the inclination angle of ribs 13 is reduced, the grommet 10 can be inserted with just a small force.

When the external surface of the ribs 13 reaches to the level of the end protrusion portion of tubular portion sidewall 16*b* of the body latch groove portion 16, the operator feels the second resistance as the peripheral rim of the aperture H is fitted into a notch 17. From the position of 13*d*, the external surface of the ribs 13 is a flat surface parallel to the direction of the axis. Since the end protrusion portion of the tubular portion sidewall 16*b* is guided to be inserted straight to the aperture H, when the operator feels the second resistance, the aperture H can be smoothly fitted to the body latch grooves 16 just by being pushed in, so that the grooves clasp the body panel.

According to the grommet 10 having the above-stated configuration, the extended tubular portion 18, which extends inside the funnel shaped portion 12, includes the water sealing zone A of the wire harness W/H, where the water sealing agent S is hardened. Therefore, the water sealing zone A is not located in the tubular portion 11 that projects from the funnel shaped portion 12 into the passenger compartment (X) side. Accordingly, the wire harness W/H can be bent easily, together with the tubular portion 11, therefore, flexibility and wiring availability of the wire harness W/H in the passenger compartment (X) side is enhanced.

Further, the extended tubular portion 18 is reinforced by ribs 19. These ribs prevent the extended tubular portion 18 from being turned up, and secure the wire harness W/H to be fitted therein. Since the ribs 19 are also reinforced by joining the funnel shaped portion 12, even when the wire harness W/H is forcibly pulled when it is fixed to the car body panel P, the funnel shaped portion 12 can hardly be deformed. Therefore, the body latch groove 16 is prevented from being detached from the peripheral rim of the aperture H.

Since the internal diameters of the extended tubular portion 18 and tubular portion 11 are smaller than the external diameter of the wire harness W/H, the wire harness W/H is tightly held in both the tubular portion 11 and the extended tubular portion 18, so that water sealing is further improved. Moreover, the internal circumferential surface of the extended tubular portion 18 is provided with a plurality of circular ribs 18*a*, which firmly hold the wire harness W/H and further enhance water-sealing capacities.

Figure 5A:
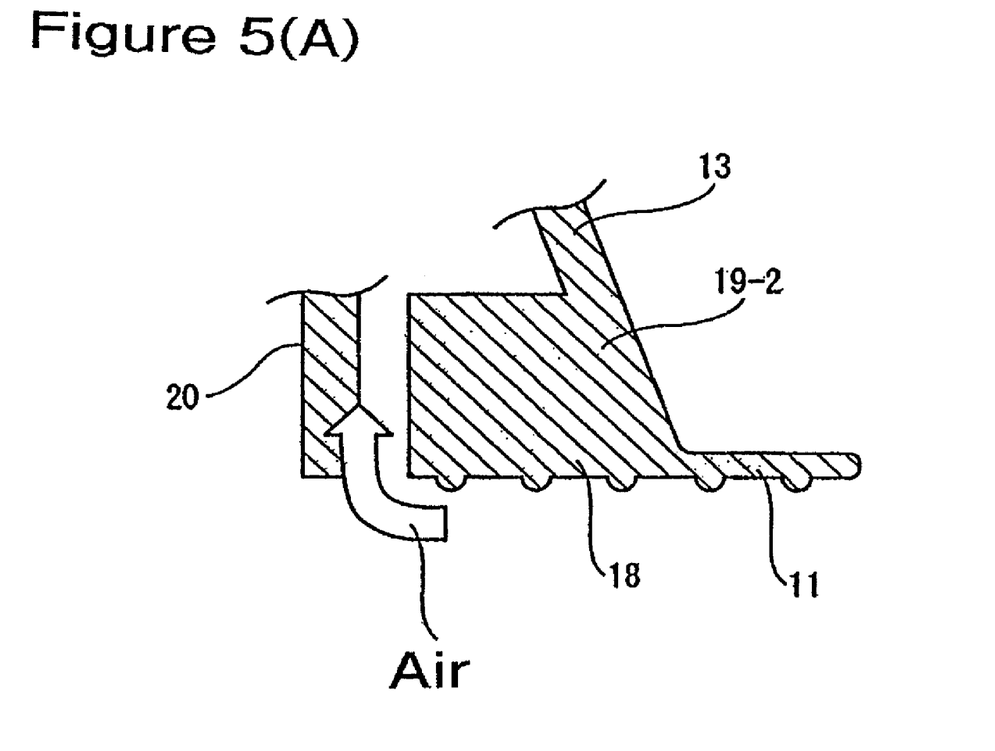
FIG. 5A shows air flow in a process of a center core removal during a process of forming the grommet of the present invention.
Figure 5B:
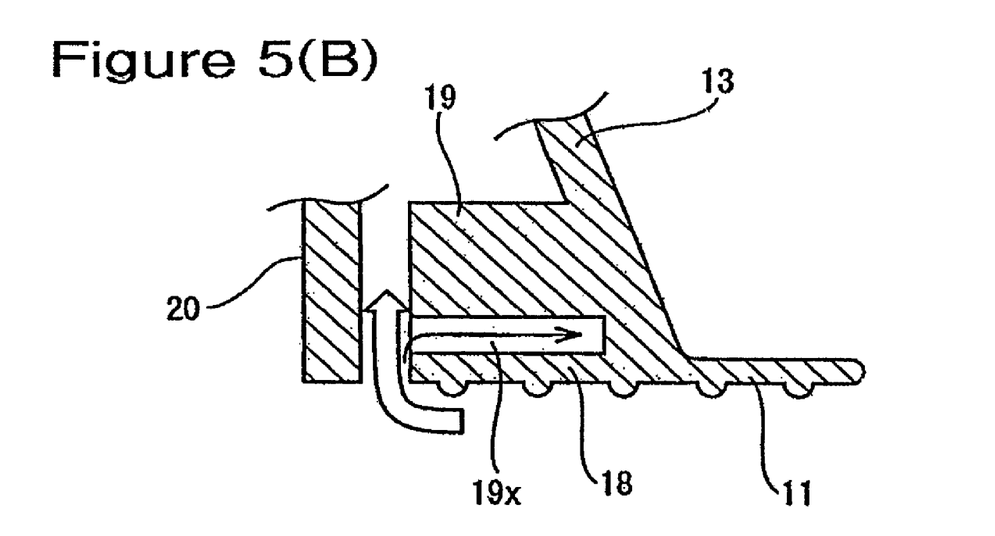
FIG. 5B shows air flow in a process of a center core removal during a process of forming the grommet of the present invention.

As for the formation method, the grommet 10 is formed by the metal mold 100 containing the upper, center and lower molds 101 through 103 and the center core 104 as shown in the FIG. 9. When the grommet is formed in the metal mold 100, the grommet 10 is first formed in the metal mold 100, then the upper, center and lower molds 101 through 103 are removed. Similar to the conventional example, air is injected between the center core 104 and the grommet 10 using an air gun 120. As shown in FIG. 5A, in the part where the type two rib 19-2 is provided, injected air can flow more easily between the type two rib 19-2 and closed face 20, due to not having a groove or a notch 7 shown in the FIG. 8. Further, as shown in FIG. 5B, in the part where the type one ribs 19-1 are provided, grooves 19*x* are formed extending to the direction of the axial line rather than having a notch 7, therefore, the air pressure can be given to the internal surface of the funnel shaped portion 12 through the grooves 19*x*. In this manner, by improving the configuration of the rib 19, the grommet 10 is expanded by the air provided when the center core 104 is removed, and thereby the center core 104 can be removed smoothly.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A grommet comprising:
    a funnel shaped portion including a small diameter end portion;
    a tubular portion provided at the small diameter end portion of the funnel shaped portion;
    an extended tubular portion projecting from the tubular portion and extending inside the funnel shaped portion; and
    a plurality of ribs provided on an external circumferential surface of the extended tubular portion, said ribs extending in a longitudinal direction of the extended tubular portion and radiating outwardly therefrom;
    wherein said plurality of ribs includes a type one rib having an element linking said type one rib to the exterior of the extended tubular portion and a groove on each side of said element, and a type two rib having an element linking said type two rib to the exterior of the extended tubular portion without grooves.

2. The grommet according to claim 1, wherein the type one rib and the type two rib have one of a trapezoidal shape and a triangular shape, including an inner side linked to the external circumferential surface of the extended tubular portion, a base linked to the internal surface of the funnel shaped portion, and
    an external side and an upper side spaced from the internal surface of the funnel shaped portion.

3. The grommet according to claim 1, wherein said plurality of ribs comprises a total of four ribs including at least one type one rib and a type two rib.

4. The grommet according to claim 1, wherein said grommet is formed unitarily and in one piece.

5. The grommet according to claim 1, wherein said grommet is formed of one of rubber and an elastomer.

6. The grommet according to claim 1, wherein the grommet is inserted into an aperture of a car body panel after a wire harness is passed through and attached to the funnel shaped portion and the tubular portion, and a body latch groove provided on the external circumferential surface of the funnel shaped portion is latched to the car body panel.

7. The grommet according to claim 1, wherein each of said plurality of ribs is linked to the internal surface of the funnel shaped portion.

8. The grommet according to claim 1, wherein said plurality of ribs comprises one type two rib and at least one type one rib.

9. The grommet according to claim 1, wherein said plurality of ribs comprises one type two rib and a plurality of type one ribs.

10. The grommet according to claim 1, wherein the grommet comprises four ribs positioned at ninety degree intervals.

11. The grommet according to claim 1, wherein the grommet comprises one type two rib and three type one ribs.

12. The grommet according to claim 11, wherein a wall thickness of each of said type one ribs is in the range of 4-6 millimeters.

13. The grommet according to claim 12, wherein a wall thickness of said type two rib is in the range of 4-6 millimeters.

14. The grommet according to claim 13, wherein said element linking said type one rib to the exterior of the extended tubular portion with grooves on each side thereof comprises a thin portion having a wall thickness in the range of 1-2 millimeters.

15. A method of forming a grommet including a funnel shaped portion including a small diameter end portion; a tubular portion provided at the small diameter end portion of the funnel shaped portion; an extended tubular portion projecting from the tubular portion and extending inside the funnel shaped portion; and a plurality of ribs provided on an external circumferential surface of the extended tubular portion, said ribs extending in a longitudinal direction of the extended tubular portion and radiating outwardly therefrom; wherein said plurality of ribs includes a type one rib having an element linking said type one rib to the exterior of the extended tubular portion and a groove on each side of said element, and a type two rib having an element linking said type two rib to the exterior of the extended tubular portion without grooves; said method comprising:
    providing a metal mold including an upper mold, a center mold, a lower mold and a center core;
    filling the metal mold with a grommet forming material;
    removing the upper mold, center mold and lower mold thereafter;
    injecting air between an external surface of the center core and the grommet so that the grommet is expanded; and
    removing the center core from the expanded grommet.

16. The method of forming a grommet according to claim 15, wherein filling the metal mold with a grommet forming material further comprises:
    filling the metal mold with a material comprising one of rubber and elastomer to form the grommet.

17. The method of forming a grommet according to claim 15, said method further comprising:
    forming the type one rib and the type two rib having one of a trapezoidal shape and a triangular shape, including an inner side linked to the external circumferential surface of the extended tubular portion, and a base linked to the internal surface of the funnel shaped portion, and
    wherein an external side and an upper side are spaced from the internal surface of the funnel shaped portion.

18. The method forming a grommet according to claim 15, said method further comprising:
    forming said plurality of ribs comprising a total of four ribs including at least one type one rib and a type two rib.

19. The method of forming a grommet according to claim 15, said method further comprising:
    forming said grommet unitarily and in one piece.

20. The method of forming a grommet according to claim 15, said method further comprising:
    forming each of said plurality of ribs so that each of said ribs linked to the internal surface of the funnel shaped portion.

* * * * *